UNITED STATES PATENT OFFICE.

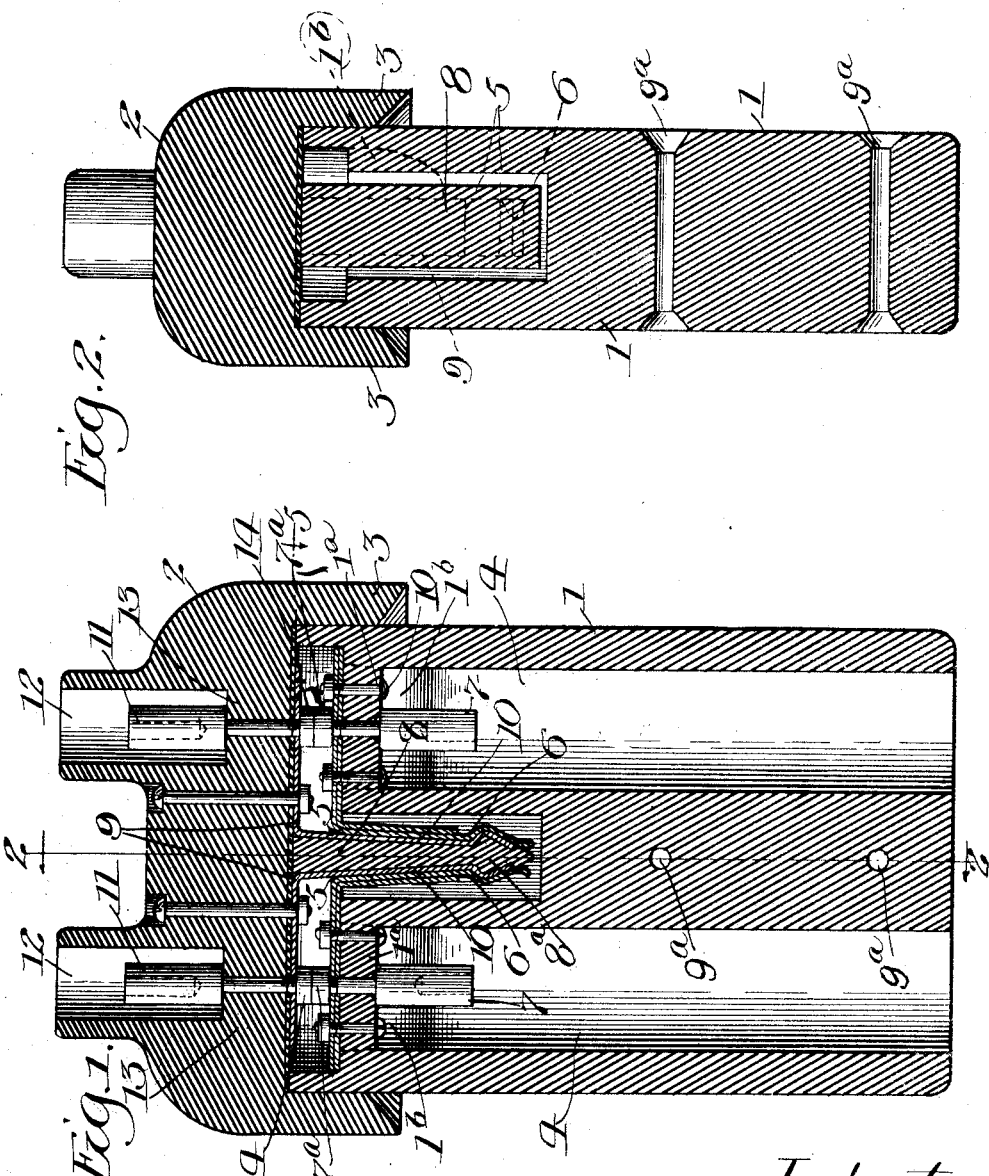

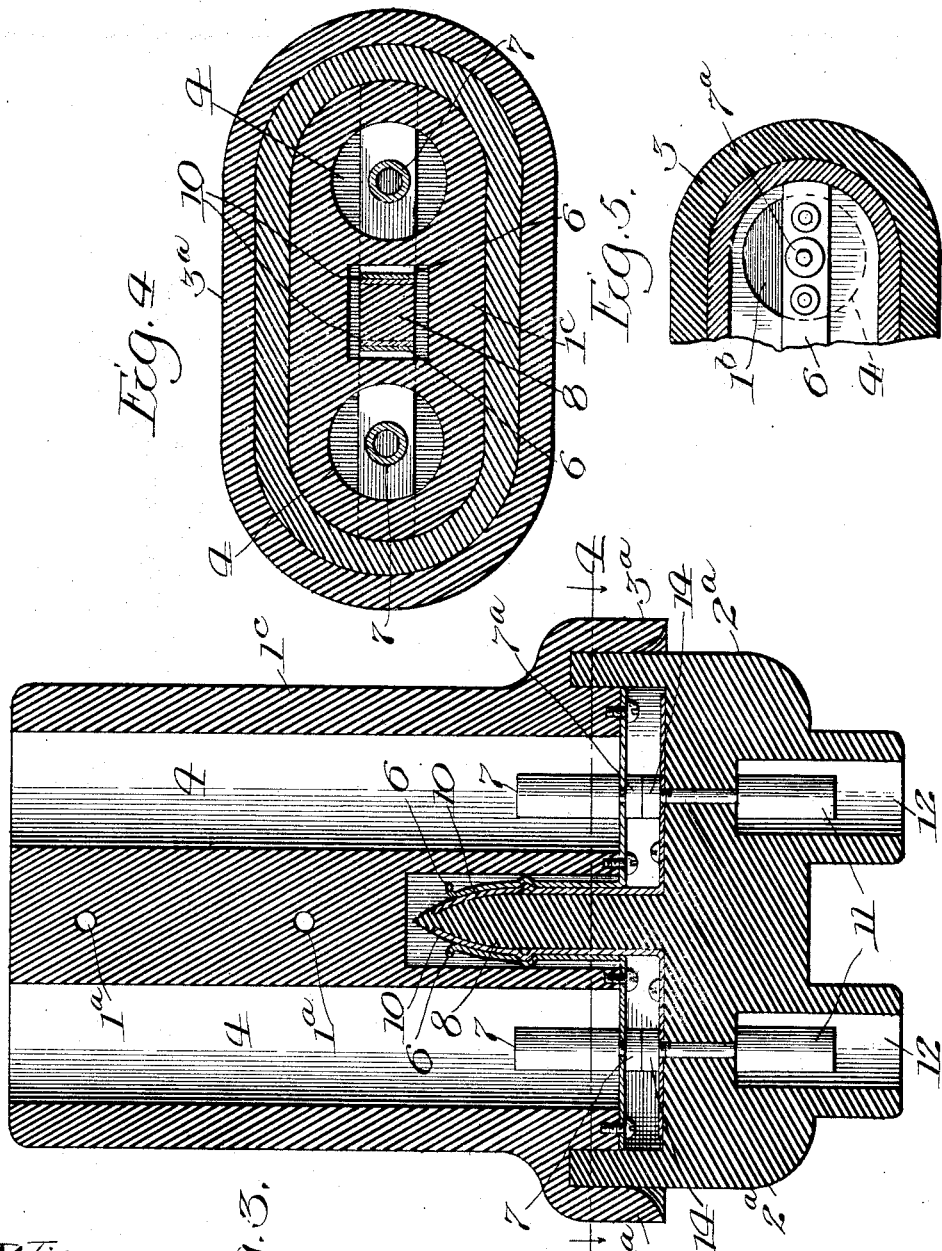

PAUL F. WILLIAMS, OF CHICAGO, ILLINOIS, ASSIGNOR TO G. & W. ELECTRIC SPECIALTY CO., OF CHICAGO, ILLINOIS, A CORPORATION OF ILLINOIS.

COMBINATION POTHEAD AND SERIES CUT-OUT.

1,190,836. Specification of Letters Patent. Patented July 11, 1916.

Application filed December 23, 1908. Serial No. 468,920.

*To all whom it may concern:*

Be it known that I, PAUL F. WILLIAMS, a citizen of the United States, residing at Chicago, in the county of Cook and State of Illinois, have invented a certain new and useful Improvement in Combination Potheads and Series Cut-Outs, of which the following is a full, clear, concise, and exact description, reference being had to the accompanying drawings, forming a part of this specification.

My invention relates to devices for terminating and connecting cables, wires and other conductors.

The principal object of the invention is to provide a simple, practical and inexpensive device capable of serving as a terminal for the ends of two cables forming the opposite sides of a circuit and for two overhead wires to be connected therewith, and also capable of connecting the wires from the cables, and short circuiting the latter so as to maintain the cable circuit closed. Such a device I call a "combination pot head and series cut out," it being apparent that the device is especially adapted for a cut out for a series circuit.

Other objects of the invention are to make the device air tight and water tight, so that it can be used on outside work, and even so that it can be immersed in water without damage or trouble; to gain efficiency, effectiveness, simplicity, cheapness and other desirable results.

In the accompanying drawings Figure 1 is a longitudinal section of a combination pot head and series cut out embodying my invention; Fig. 2 is a cross section of the same taken on line 2—2 in Fig. 1; Fig. 3 is a longitudinal section of a modified form of the device; Fig. 4 is a cross section of the same on line 4—4 in Fig. 3; and Fig. 5 is a view of a portion of the device taken on line 5—5 in Fig. 1.

The device shown for carrying out my invention and especially the form illustrated in Figs. 1 and 2, comprises a base 1 and a top or cover 2, both of which are desirably made of insulating material, preferably porcelain. The cover 2 fits snugly over the base 1, and has an overhang 3 extending a short distance down the sides of the base 1. Both of these parts are made of greater width than thickness, so that the base 1 can be provided with two separate channels or bores 4, which extend up from the bottom of said base to substantially the top thereof as shown in Fig. 1. At the upper end of the base 1 are two contact members 5—5, each of which is conveniently in the form of a flat metal strip extended across and secured to portions 1ª, 1ª, at the upper ends of the bores 4, 4. These metal strips have downwardly extending end or tail pieces 6, 6, which form the contacts, strictly speaking. The two tail pieces or contacts 6, 6 are adjacent to one another and extend to and meet each other when free to do so. Metal terminal lugs 7, 7 are located at the upper ends of the bores 4, 4. These lugs are socketed at their lower ends, as shown in dotted lines Fig. 1, to receive the ends of cable conductors, when bared of insulation. The upper ends of these lugs are reduced in size and passed through the walls 1ª, 1ª, and provided with nuts 7ª, 7ª, to hold them in place. The ends of the cable conductors are to be secured to these lugs, as by sweating, when the lugs are removed from the device, and then they are inserted in the bores 4, 4 and up through the walls 1ª, 1ª, and secured in place by the nuts 7ª 7ª. The bores 4, 4 are then to be filled with insulating material or compound, and to permit this to be inserted, passageways 1ᵇ, 1ᵇ, are formed in the porcelain in front of the terminals 7, 7. Bolt holes 9ª—9ª are provided in the base 1, for the purpose of holding the pot head in place. The insulating material is not shown in the drawings, being omitted for convenience of illustration.

The top 2 is provided with a downwardly extending prong 8 made of insulating material, and also with a pair of contact strips 9, 9, having downwardly extending end pieces 10, 10, which are secured to the opposite sides of the prong 8, but terminate above the lower end of the same as shown in the figures. The prong 8 is provided with an enlargement 8ª at its lower end, and the metal strips or contacts 6—6 and 10—10 are correspondingly shaped, so that there is a clasping or locking engagement between the prong and its coöperating contacts. Thus when the top 2 is placed in position upon the base 1, the prong 8 passes down between the spring contacts 6—6 and separates the same, and at the same time places the metallic contacts 10, 10 in contact with the contacts 6, 6, thereby opening the circuit between the terminal 7, 7 and including the contacts 9, 9 in said circuit. Terminals 11, 11, similar to the terminals 7, 7, are located in sockets 12, 12 in the top 2, and have reduced ends passing down through walls 13, 13, and provided with nuts 14, 14 to hold them in place. The overhead or other wires or conductors are to be secured to the terminals 11, 11, and then the latter put in place in the top 2 and insulating material filled into the chambers 12, 12. Thus the circuit can be closed through the device with its top removed, and then another circuit, such as a lamp circuit, can be included in the cable circuit by putting the top in place. When the top is removed, the contacts 6, 6 close the cable circuit before the contacts 10, 10 are separated from them.

The device is not only air tight, as far as cable ends are concerned, and secured against the entrance of rain if used in outside work, but at the same time is so water tight that it can be immersed in water without injury, because should the device not be absolutely tight, all wires being sealed in, the water will force the air upward and form an air cushion around the contact members and this air cushion will prevent access of water to the same.

The member 1 is provided with apertures by which it can be fastened in place by screws or nails.

The form shown in Figs. 3 and 4 is intended more particularly for use on outside work where it is desirable to have the device used more or less in an opened condition with the lamp out of circuit. This form is more or less similar to the device shown in Figs. 1 and 2, being that device inverted and arranged accordingly. This form comprises a member 1ᶜ, which corresponds substantially with the lower member or base 1 of the device of Figs. 1 and 2, and a lower member 2ᵃ, which corresponds substantially with the upper member 2 of said other form. The upper member 1ᶜ is provided with a flaring or overhanging portion 3ᵃ, which fits over the lower member 2ᵃ, and the two members 1ᶜ and 2ᵃ are provided with metallic contacts and terminals the same as the members 1 and 2 of the first described device. The operation is substantially the same, the lower member 2ᵃ being attached to and detached from the upper member 1ᵃ and the connections being made and unmade the same as described in connection with said first form. It will thus be seen that in this form the lamp or other circuit will be connected in and out of circuit by attaching and detaching the member 2ᵃ and that when the member 2ᵃ is withdrawn and disconnected from the member 1ᶜ all of the contacts and terminals of the latter will be guarded against rain and moisture, it being understood of course that the channels or bores 4—4 are filled with insulating material so as to cement the wires or conductors therein.

Thus it will be seen that the device is made entirely of insulating material, and so insures impermeability to moisture and prevents leakage of current. It can be used in outside work or in water. It forms a terminal for the cables, and seals them hermetically and connects them, and also serves to hold the cables in position.

It will be understood that changes and modifications can be made without departing from the spirit of the invention.

What I claim is:

1. A device of the class specified comprising a base member provided with two vertically arranged bores open at their lower ends and closed at their upper ends, metallic terminals for the connection of electrical conductors at the upper ends of said bores, said member being also provided with a space or recess located between said bores and open at its upper end and closed at its lower end, contact devices connected with said terminals and extended to said recess and into the same, a top fitted upon and covering the upper end of said base member, said top being provided with a pair of vertically arranged bores or channels open at their upper ends and closed at their lower ends, terminals for the connection of electrical conductors at the lower ends of said top bores or channels, and contact devices connected with said top terminals and extended downwardly so as to coöperate with the contact devices in the recess in said base member.

2. A device of the class specified comprising a base member provided with two vertically arranged bores open at their lower ends and closed at their upper ends, metallic terminals for the connection of electrical conductors at the upper ends of said bores, said member being also provided with a space or recess located between said bores and open at its upper end and closed at its lower end, contact devices connected with said terminals and extended to said recess and into the same, a top fitted upon and covering the upper end of said base member, said top being provided with a pair of vertically arranged bores or channels open at their upper ends and closed at their lower ends, terminals for the connection of electrical conductors at the lower ends of said top bores or channels, and contact devices connected with said top terminals and extended downwardly so as to coöperate with the contact devices in the recess in said base member, said contacts on said top being mounted upon a prong or projection 8 extending downwardly from the lower surface of said top and said base member having the upper ends of its vertically arranged bores or channels provided with side enlargements 1ᵇ adapted to permit insulating cement to be poured into said bores or channels from above.

3. The combination of a base member provided with upwardly extending bores for conductors, the upper ends of said bores being closed and the lower ends being open, terminals at the upper ends of said bores, said terminals being constructed for the connection of electrical conductors and having extensions extending through the walls closing the upper ends of said bores, a top covering the upper end of said base member, said top being provided with bores for conductors, said bores having their upper ends open and their lower ends closed, terminals at the lower ends of said top bores, said terminals being constructed for the connection of electrical conductors in said bores and having extensions extending through the walls closing the lower ends of said bores, and coöperating contact members within said base member and top, the contacts on the base member being connected with the extensions of the base member terminals, and the contacts on the top being connected with the extensions of the terminals of said top.

4. The combination of a base member provided with upwardly extending bores for conductors, the upper ends of said bores being closed and the lower ends being open, terminals for connection of conductors at the upper ends of said bores, said terminals having extensions extending through the walls closing the upper ends of said bores, a top fitted upon and covering the upper end of said base member, said top being provided with bores for conductors having their upper ends open and their lower ends closed, terminals for the connection of conductors at the lower end of said top bores, said terminals having extensions extending through the walls closing the lower ends of said bores, and coöperating contact members within said base member and top, the contacts on the base member being connected with the extensions of the base member terminals and the contacts on the top being connected with the extensions of the terminals of said top, said base contact members comprising metallic strips normally making contact with one another, and the contacts on the top comprising metallic strips separated and insulated from each other and adapted when the top is put in position upon the base member, to pass between and separate the contact strips on said base member, making contact with the same.

5. The combination of a base member provided with upwardly extending bores closed at their upper ends and provided at said upper ends with terminals for the connection of conductors in said bores, a top member covering and protecting said base member, terminals adapted for connection of electrical conductors carried by said top member, said terminals being located on the outer side of portions of the wall of said top which is accessible when the top is in place upon the base, said terminals having extensions extending through said wall portions of said top to the inside thereof, and coöperating contact devices on said top and base member.

6. The combination of a base member, terminals for the connection of electrical conductors, said terminals being located on the outer side of the wall of said base member and having extensions extending through said wall to the interior of said base member, a top fitting over and covering said base member and protecting the same from the elements, terminals for the connection of electrical conductors carried by said top, said terminals being located on the outer side of portions of the wall of said top which are outside of the base member when the top is in position on the same and having extensions extending through said wall portion to the interior of said top, and coöperating contact devices inside of said base member and top, said contact devices being connected with the inner ends of said terminal devices.

7. The combination of a base member provided with recesses open at their lower ends and closed at their upper ends, metallic terminals for the connection of conductors located at the upper ends of said recesses, said terminals being provided with extensions extending from said conductor connecting portions through the walls at the upper ends of said recesses, metallic contact strips secured to the inner surfaces of said walls, said contact strips being provided with laterally bent end portions normally in contact with one another, said base member being provided with a third recess located between the aforesaid recesses and said normally contacting portions of said contact strips being located in said third recess, a top fitting upon and covering the upper end of said base member, said top being provided with downwardly extending recesses open at their upper ends and closed at their lower ends, metallic terminals for the connection of electrical conductors located at the lower ends of said top recesses, said terminals having extensions extending through the walls closing the lower ends of said top recesses to the inner surface of said top, metallic strips secured to said inner surface of said top and connected with the inner ends of said top terminal extensions, said metallic strips being extended toward one another and then bent downwardly and said top being provided with a projection located between said bent portions of said strips, said projection serving to separate and insulate said bent portions and guide the same between the normally contacting portions of the contact strips on said base member.

In witness whereof, I hereunto subscribe my name this 14th day of December A. D., 1908.

PAUL F. WILLIAMS.

Witnesses:
A. MILLER BELFIELD,
E. B. CAMPBELL.

Copies of this patent may be obtained for five cents each, by addressing the "Commissioner of Patents, Washington, D. C."